(12) United States Patent
Ito

(10) Patent No.: US 7,497,503 B2
(45) Date of Patent: Mar. 3, 2009

(54) VEHICLE FRONT STRUCTURE

(75) Inventor: Katsuyoshi Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/071,031

(22) Filed: Feb. 14, 2008

(65) Prior Publication Data

US 2008/0203763 A1 Aug. 28, 2008

(30) Foreign Application Priority Data

Feb. 26, 2007 (JP) .............................. 2007-046177

(51) Int. Cl.
*B60J 7/00* (2006.01)
(52) U.S. Cl. ............................ 296/187.04; 296/193.11; 296/187.09
(58) Field of Classification Search ............ 296/187.09, 296/187.1, 187.04, 187.12, 193.11
See application file for complete search history.

(56) References Cited

U.S. PATENT DOCUMENTS 6,554,341 B2 * 4/2003 Lee .............................. 296/29

2002/0171262 A1 * 11/2002 Ozawa ........................ 296/189
2003/0052517 A1 * 3/2003 Nakata ........................ 296/194
2005/0057076 A1 * 3/2005 Roux et al. ................... 296/198

FOREIGN PATENT DOCUMENTS

| JP | A-2001-278124 | 10/2001 |
| JP | A-2003-267265 | 9/2003 |
| JP | A-2005-014763 | 1/2005 |

* cited by examiner

*Primary Examiner*—Joseph D Pape
(74) *Attorney, Agent, or Firm*—Oliff & Berridge, PLC

(57) ABSTRACT

A vehicle front structure that includes: a fender panel having an outer wall, and an inside end part being bent at a boundary part with a hood panel; an apron upper member that extends in substantially the vehicle longitudinal direction, parallel to the outer wall; a shock-absorbing part that links an inside end of the fender panel and the apron upper member; a cover member, the base end of which is mounted on the inside and that hangs downward as a free end in the substantially downward direction of the vehicle, covers the distal end of the inside and the shock-absorbing part, and extends in substantially the direction transverse direction of the vehicle; and a vehicle side-structure that includes an insertion part formed in substantially the vehicle longitudinal direction near the distal end of the cover member, and into which the cover member may be inserted from above.

12 Claims, 7 Drawing Sheets

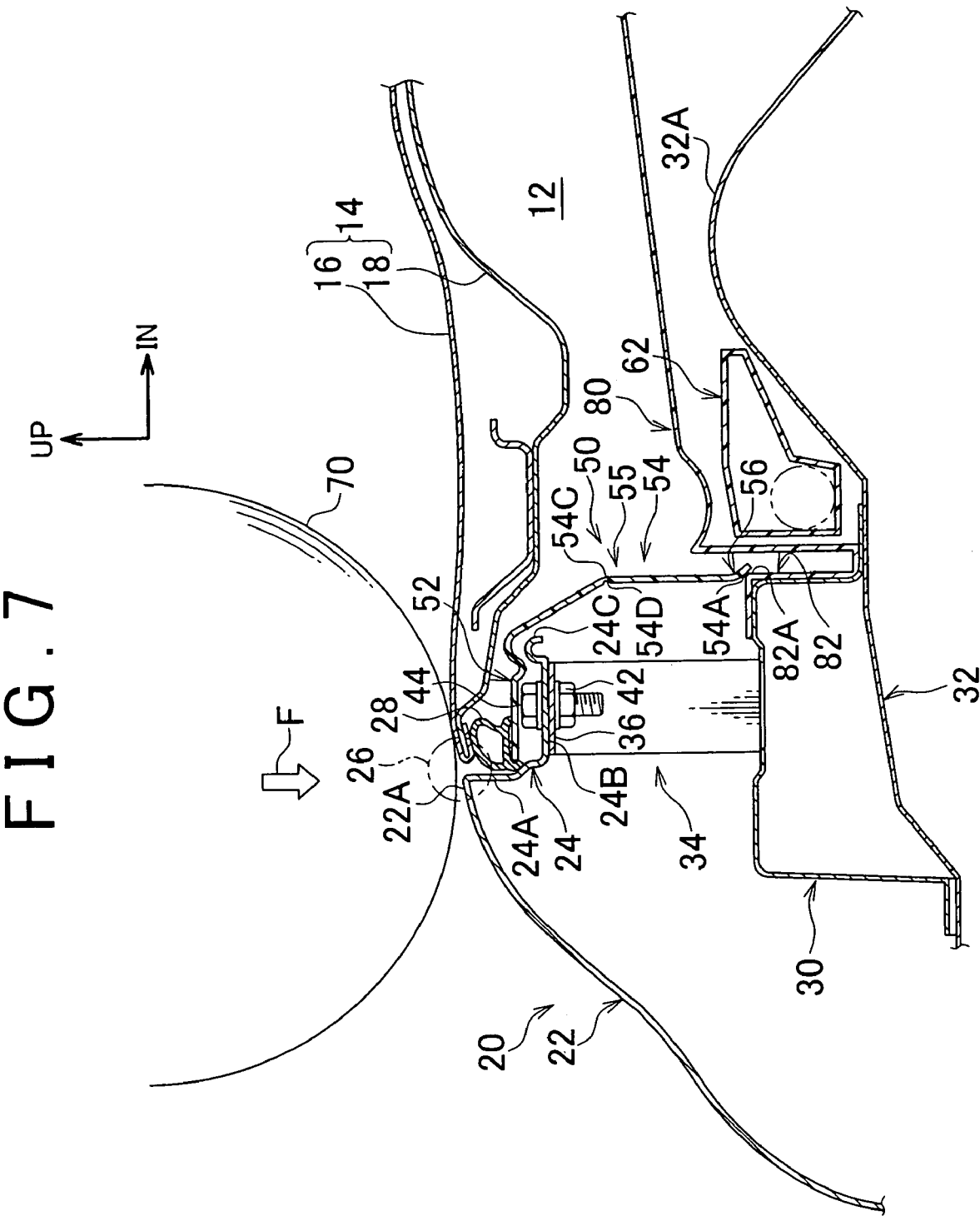

VEHICLE FRONT STRUCTURE

INCORPORATION BY REFERENCE

The disclosure of Japanese Patent Application No. 2007-046177 filed on Feb. 26, 2007 including the specification, drawings and abstract is incorporated herein by reference in its entirety.

BACKGROUND OF THE INVENTION

1. Field of the Invention

The present invention relates to vehicle front structure in which a base portion of a cover member is mounted on an inside edge of a fender panel.

2. Description of the Related Art

In a vehicle front structure, in order to improve pedestrian protection performance, there are cases in which the inside edge of a front fender panel is mounted to an apron upper member via an energy-absorbing bracket (refer to, for example, Japanese Patent Application Publication No. JP-A-2005-14763). In a conventional structure, from the standpoint of appearance, for example, the inside edge of the front fender panel or energy-absorbing bracket might be covered and hidden by a fender protector from the inside in the transverse direction of the vehicle, one end part of the fender protector being mounted to the end part on the inside of the fender panel and also mounted to the apron upper member.

In the above-described structure, however, when a body colliding with the upper end part of the fender panel acts to present a load from above the vehicle, with the fender protector generating a prescribed repulsive force, there is generally a shortening of the deformation stroke on the front fender panel side, and there are cases in which it is difficult to set a good load versus stroke characteristic.

SUMMARY OF THE INVENTION

The present invention provides a vehicle front structure that seta a good load versus stroke characteristic when a collision occurs, while maintaining a good appearance on the inside of the fender.

The vehicle front structure according to a first aspect of the present invention is a vehicle front structure having: a fender panel having an outer wall that forms a side of the vehicle front, an inside end part being bent at a boundary part with a hood panel; an apron upper member that extends in substantially the vehicle longitudinal direction, parallel to the outer wall of the fender panel; a shock-absorbing part that links an inside end of the fender panel and the apron upper member; a cover member, the base end of which is mounted on the inside of the fender panel and that hangs downward as a free end in the substantially downward direction of the vehicle, covers the distal end on the inside of the fender panel and the shock-absorbing part, and extends in substantially the direction transverse direction of the vehicle; and a vehicle side-structure that includes an insertion part formed in substantially the vehicle longitudinal direction near the distal end of the cover member, and into which the cover member may be inserted from above.

The above-described aspect enables a good load versus stroke characteristic to be set when a collision occurs, while maintaining a good appearance on the inside of the fender. Specifically, the shock-absorbing part links the inside end part of the fender panel with the apron upper member and, in a structure in which the terminal end side on the inside of the fender panel is fixed to the apron upper member, it forms a part of the inside end part of the fender panel and deformation is possible in the direction of crushing with respect to a load applied from above, the result being that, when a load of a colliding body acts on the upper end part of the fender panel, energy of the collision is absorbed by the deformation of the shock-absorbing part. Also, because the inside terminal part of the fender panel and the shock-absorbing part are covered and hidden by the cover member that extends in substantially the vehicle longitudinal direction, when the hood is opened, for example, the inside terminal end part and shock-absorbing part of the fender panel are not visible by a worker from the front of the vehicle. Also, at the insertion part of the vehicle side-structure in which is formed an insertion opening along substantially the vehicle longitudinal direction in the vicinity of the distal end of the cover member, because the cover member can be inserted thereinto when a load from a colliding body acts on the upper end of the fender panel, even if the fender panel and shock-absorbing part deform, by the cover member being inserted into the insertion part, there is almost no repulsing force from the cover member to the fender panel side.

BRIEF DESCRIPTION OF THE DRAWINGS

The foregoing and further features and advantages of the invention will become more apparent from the following description of example embodiments with reference to the accompanying drawings, in which like numerals are used to represent like elements, and wherein:

FIG. 7 is a cross-sectional view showing the vehicle front structure according to a second embodiment of the present invention.

DETAILED DESCRIPTION OF THE EMBODIMENTS

Figure 1:
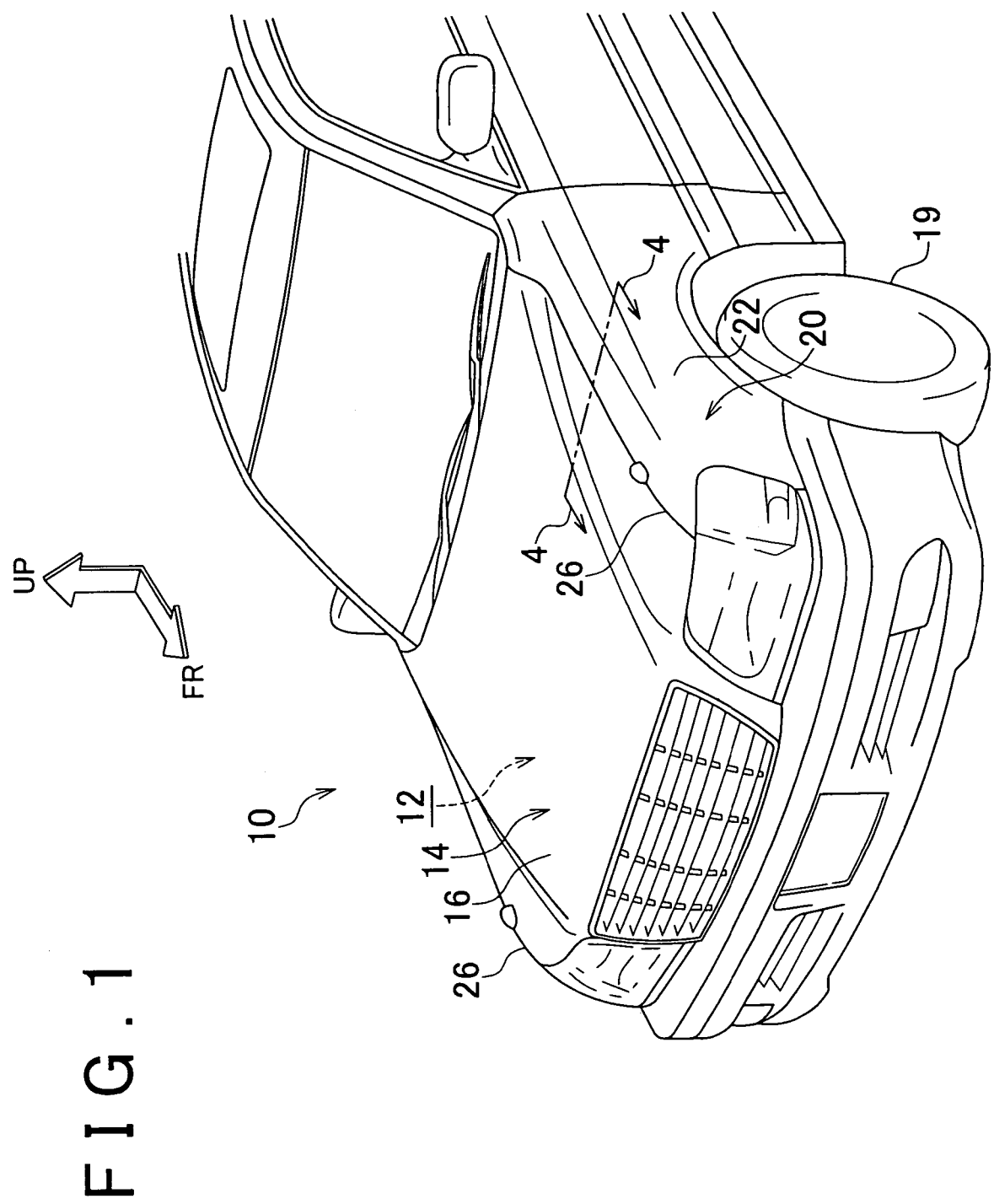
FIG. 1 is a perspective view showing a vehicle to which a vehicle front structure according to a first embodiment of the present invention is applied.

In the following description, the present invention will be described in more detail in terms of exemplary embodiments.

The first embodiment of the present invention will now be described. In the drawings, the UP, FR, and IN arrows represent the vehicle upward direction, vehicle front direction, and vehicle inward direction (in the transverse direction), respectively.

Figure 3:
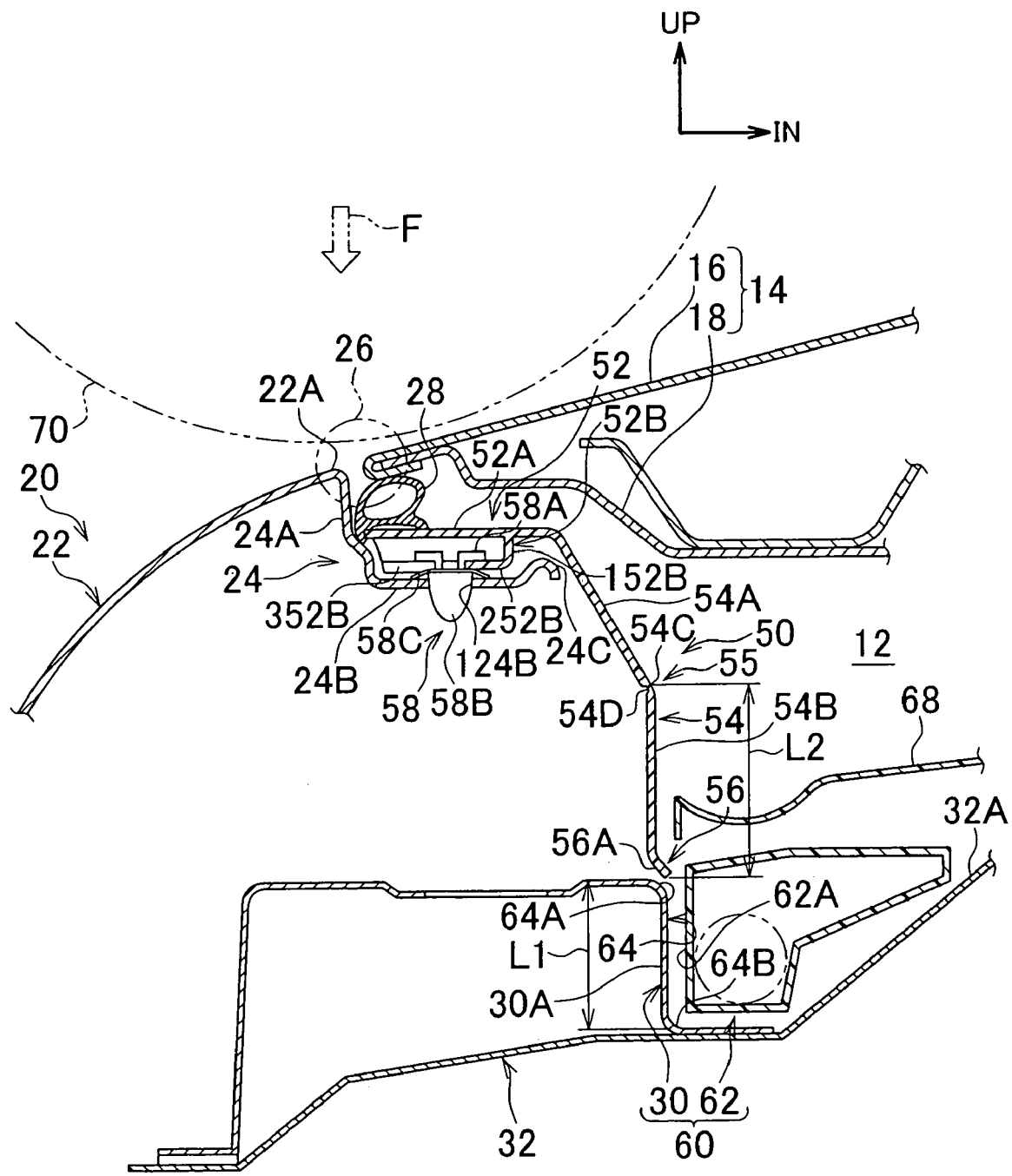
FIG. 3 is an enlarged cross-sectional view corresponding to the 3-3 cross-section in FIG. 2.

As shown in FIG. 1, a hood 14 made of metal is disposed in the vehicle upward direction above the engine room 12 so as to be able to open the engine compartment 12. As shown in FIG. 3, the hood 14 includes a hood outer panel 16 forming the outer sheet of the hood 14, and a hood inner panel 18 forming the inner sheet of the hood 14. The outer peripheral part of the hood outer panel 16 is joined by hemming to the hood inner panel 18.

As shown in FIG. 1, an outer wall part 22 of the front fender panel 20 is disposed on the side of the hood outer panel 16, that is, on the side of the vehicle front 10. The boundary part 26 between the hood outer panel 16 that forms the outer sheet of the hood 14 and the front fender panel 20 that forms the side of the vehicle front 10 extends substantially along the longitudinal direction of the vehicle at both end parts of the hood 14 in the transverse direction.

As shown in FIG. 3, the front fender panel 20 includes an outer side wall part 22 that forms a designed surface that covers the top of the front wheel 19 (refer to FIG. 1), and an inner wall part 24 that hangs downward and is curved substantially in the vehicle downward direction (engine compartment 12 side) from the upper end part 22A of the outer wall part 22 at the boundary part 26 with the hood outer panel 16. The inner wall part 24 as the inner end part of the front fender panel 20 has an inner vertical wall part 24A hanging downward in substantially the vehicle downward direction from the upper end part 22A of the outer wall part 22, and a horizontal flange part 24B extending outward substantially horizontally toward the engine compartment 12 side from the lower end part of the inner vertical wall part 24A. The distal end part of the horizontal flange part 24B, that is, the inner end part 24C of the front fender panel 20, is formed to have a semicircular cross-section that is convex in the vehicle upward direction. A sealing material 28 made of a resilient material (rubber) is disposed on the vehicle inner side of the inner vertical wall part 24A, and makes pressing contact in an elastically deformed condition with both ends of the outer peripheral part of the hood 14 in the transverse direction.

Figure 4:
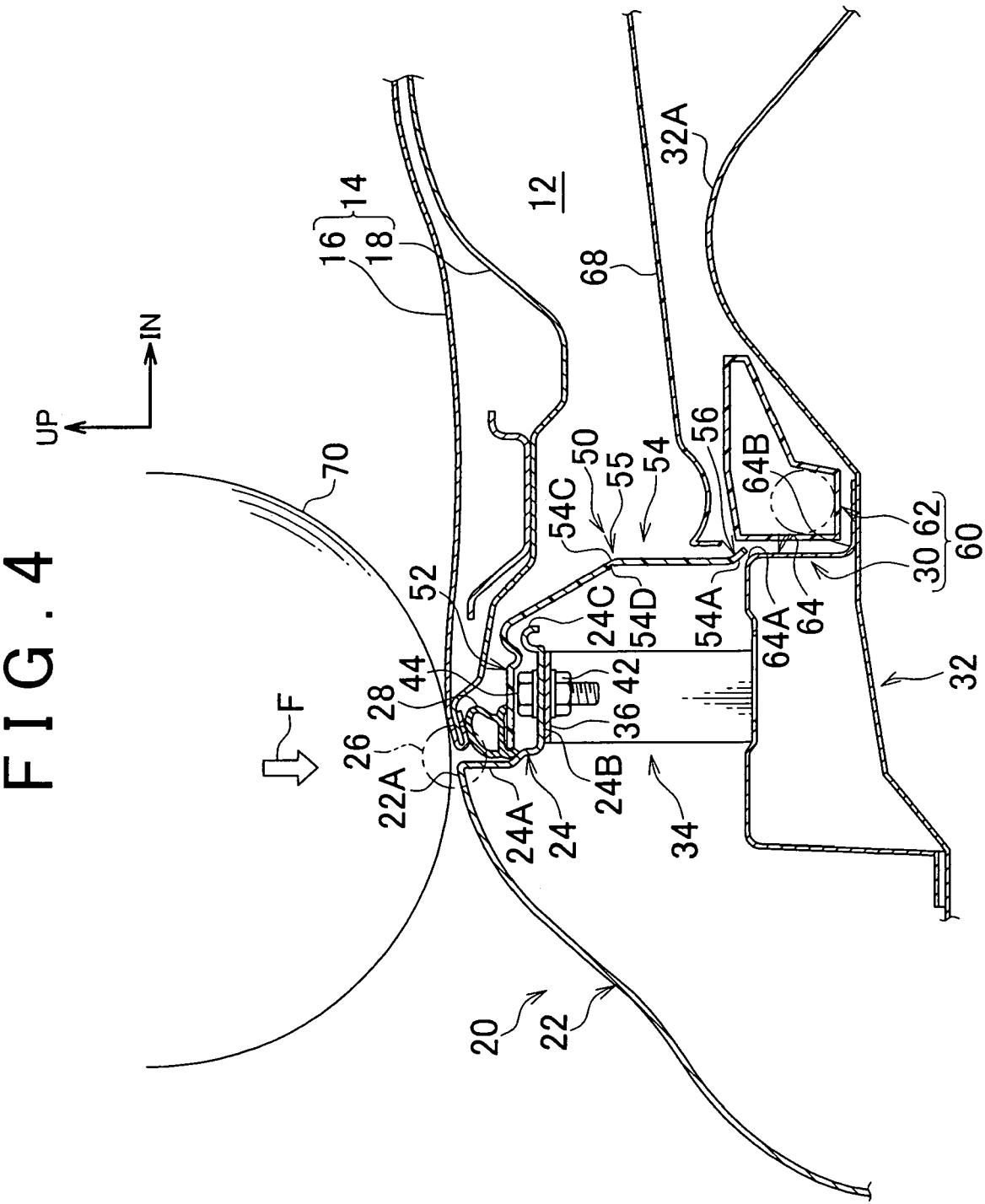
FIG. 4 is an enlarged cross-sectional view corresponding to the 4-4 cross-section in FIG. 1 (4L-4L cross-section in FIG. 2)

An apron upper member 30 that forms a part of the vehicle body is disposed on the lower side of the horizontal flange part 24B of the front fender panel 20. The apron upper member 30 is a vehicle body framework member that is disposed with its long direction in the substantially longitudinal direction of the vehicle on the inside in the transverse direction of the outside wall 22 of the front fender panel 20, having a cross-sectional shape that is open toward the lower direction of the vehicle, and being fused onto an apron sub-assembly 32 at the lower side. The apron sub-assembly 32 extends in the transverse direction below the apron upper member 30 and, as shown in FIG. 4, has a protruding part 32A facing toward the upper vehicle direction at an inside position in the transverse direction.

Figure 2:
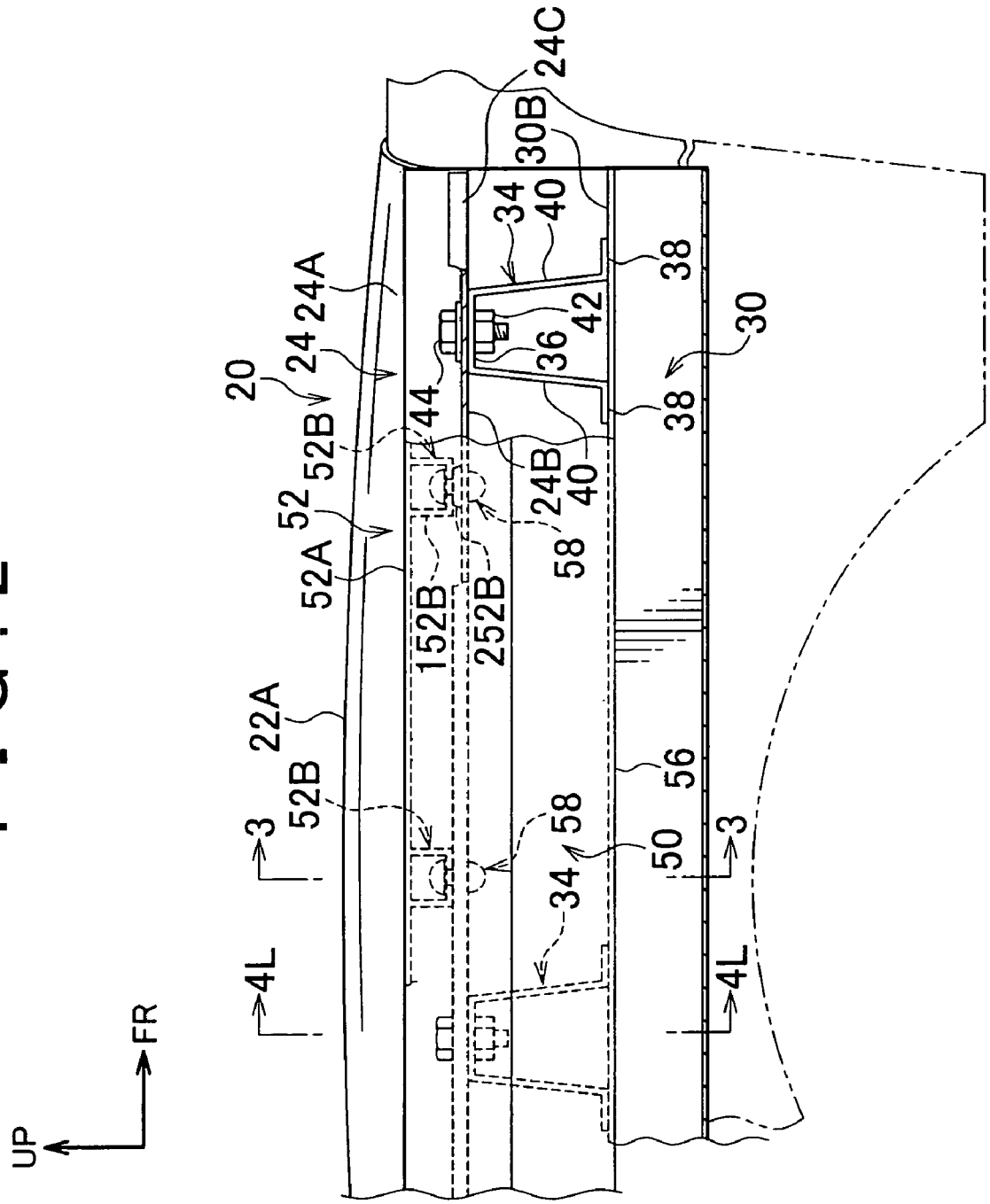
FIG. 2 is a partially cutaway side view of the vehicle front structure according to the first embodiment of the present invention, viewed from the engine compartment with sealing material not shown.

As shown in FIG. 2, a horizontal flange part 24B of the front fender panel 20 and the apron upper member 30 are linked by a shock-absorbing bracket 34 as a shock-absorbing part. A plurality of shock-absorbing brackets 34 are disposed at a prescribed interval in substantially the longitudinal direction of the vehicle. By doing this, the horizontal flange part 24B of the front fender panel 20 is supported by the apron upper member 30 via the shock-absorbing bracket 34.

The shock-absorbing bracket 34 is convex when viewed from the side of the vehicle, and includes a fender mounting part 36, a front and rear pair of apron side mounting parts 38, and a front and rear pair of support legs 40. The fender mounting part 36 fixes the horizontal flange part 24B of the front fender panel 20 and the top wall part 30B of the apron upper member 30. The apron mounting part 38 is placed onto the top wall part 30B of the apron upper member 30 in surface contact therewith, and fixed to the top all part 30B by spot welding or the like. The support legs 40 join the flat sheet fending mounting part 36 and the flat sheet apron side mounting part 38 in the top-to-bottom vehicle direction, and can be deformed in the direction of crushing with respect to the action of a load acting from the upper direction of the vehicle. That is, the shock-absorbing bracket 34 links the horizontal flange part 24B of the front fender panel 20 to the apron upper member 30 and can deform in the direction of crushing with respect to the action of a load acting from the upper direction of the vehicle.

In this case, a bolt passage hole (not shown in the drawing) is passed through the fender mounting part 36, and additionally a weld nut 42 is fused to the rear surface thereof. The horizontal flange part 24B of the front fender panel 20 rests on the upper surface of the fender mounting part 36 and the bolt 44 is inserted from above the fender mounting part 36 and screwed into the weld nut 42. In this manner, the horizontal flange part 24B of the front fender panel 20 is mounted to the top wall part 30B of the apron upper member 30 via the shock-absorbing bracket 34.

A terminal part 24C on the inside of the front fender panel 20 and a fender protector 50 as a covering member are mounting to the horizontal flange part 24B of the front fender panel 20. The fender protector 50 covers and hides the shock-absorbing bracket 34 from the inside in the transverse direction, and extends continuously in the substantially longitudinal direction of the vehicle. As shown in FIG. 3, the fender protector 50 is mounted to the horizontal flange part 24B of the front fender panel 20 via a clip 58 made of resin, and hangs downward in the substantially downward direction of the vehicle with the distal end 56 as a free end. The fender protector 50 serving as a cover is formed as a single piece using a resin material, has a relatively low rigidity, and can deform elastically.

As shown in FIG. 2 and FIG. 3, the base end part 52 of the fender protector 50 is disposed at the above the horizontal flange part 24B of the front fender panel 20, and the upper surface 52A thereof is substantially parallel with the horizontal flange part 24B. The base end part 52 of the fender protector 50 has integrally formed thereon, at a prescribed position on the lower surface side thereof, a substantially square hollow mounting seat 52B. The mounting seat 52B has one end (the left-side part in FIG. 3) that is open and also has side wall parts 152B and a base wall part 252B that is disposed substantially horizontally to join the lower ends of the side wall parts 152. The central part of the base wall part 252B in the longitudinal direction of the vehicle has formed thereon a substantially rectangular mounting cutout 352B (refer to FIG. 3) facing from the outside in the transverse direction toward the inside in the transverse direction.

As shown in FIG. 3, the clip 58 is mounted to the mounting seat 52B by an elastically deformable engaging part 58A being inserted from the mounting cutout 352B to sandwich the base wall part 252B and, with the semi-elliptical solid attachment part 58B being inserted through the clip attachment hole 124 formed in the horizontal flange part 24B, a retaining tongue 58C is supported by the peripheral part of a clip attachment hole 124B.

A vehicle body side structure 60 that includes the apron upper member 30 and a wire harness protector 62 that is provided at a distance in the inside of the transverse direction from the vertical wall part 30A of the apron upper member 30 is disposed at the side below and the surrounding area around the distal end 56 of the fender protector 50. The vehicle body side structure 60 has an insertion opening 64A formed substantially along the vehicle longitudinal direction in the vicinity of the distal end 56 of the fender protector 50, and has a insertion part 64 (interpart insertion part) in the shape of an elongated channel into which the fender protector 50 can be inserted from the insertion opening 64A when a load acts on the upper end part 22A of the front fender panel 20 from the vehicle upper direction. The insertion part 64 is a gap formed in an interpart space formed by the vertical wall part 30A on the inside of the apron upper member 30 in the transverse direction and the vertical wall part 62A on the outside of the wire harness protector 62 in the vehicle longitudinal direction substantially along the vehicle longitudinal direction, the dimensions of the gap in the insertion part 64 being set to be larger than the sheet thickness of the fender protector 50.

Although in this embodiment an engine cover 68 made of resin is formed to include the side substantially above the wire harness protector 62, the engine cover 68 is set at a position that does not hinder the advance of the fender protector 50 when the fender protector 50 is inserted into the insertion part 64.

A guide part 56A is provided in the distal end 56 as a guide means that is bent toward the inside in the transverse direction. The guide part 56A has a shape that facilitates the sliding of the fender protector 50 into the insertion part 64. Specifically, the end part thereof is a shape that is directed toward the insertion part 64, and when a load acts on the upper end 22A of the front fender panel 20 from the upward vehicle direction, by causing the distal end 56 to slide in the downward vehicle direction from the vicinity of the insertion opening 64A, the fender protector 50 is guided toward the insertion part 64.

The intermediate part 54 between the base end part 52 and the distal end 56 of the fender protector 50 includes an intermediate upper part 54A that is bent in the vehicle downward direction from the end part of the base end part 52 in the transverse direction so as to extend at an inclination on the inside in the transverse direction, and an intermediate lower part 54B that is bent at a bending part 54C from the lower end part of the intermediate upper part 54A and that extends substantially in the vehicle downward direction.

A notch 54D is formed in the bending part 54C of the intermediate part 54 of the fender protector 50, and the bending part 54C with the notch 54D formed therein is a weak part 55 that serves as the origin point for bending deformation substantially in the transverse direction. The dimension L1 from the lowermost end position 64B to the insertion opening 64A of the insertion part 64 and the dimension L2 from the distal end 56 to the weak part 55 of the fender protector 50 are set so that the relationship L2≧L1 is satisfied.

Next, the operation and effect of the above-noted embodiment will be described.

Figure 5:
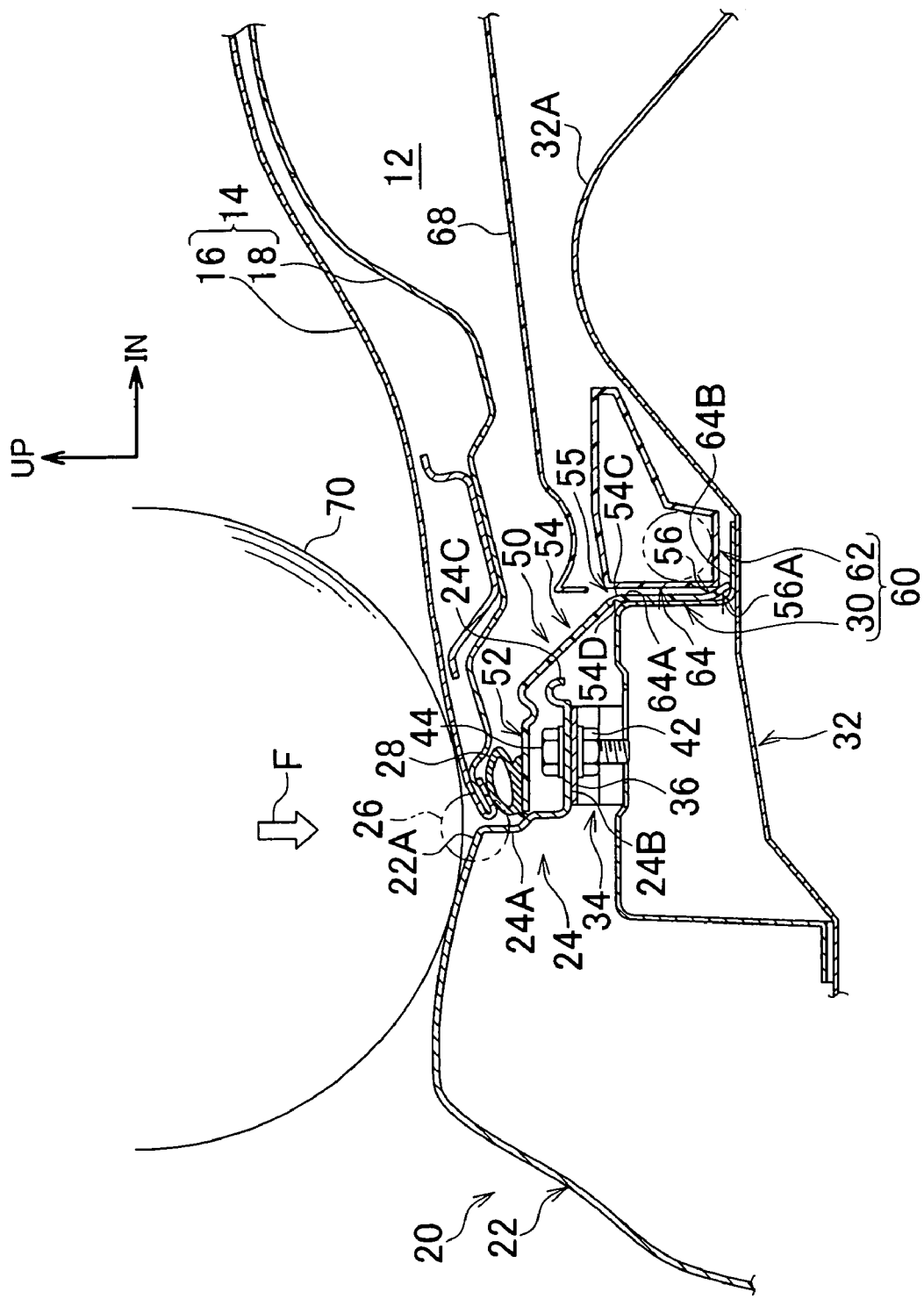
FIG. 5 is a cross-sectional view showing the condition in which, as a result of a collision with an object, there the front fender or the like is deformed.

As shown in FIG. 2, the shock-absorbing bracket 34 not only links the horizontal flange part 24B of the front fender panel 20 and the apron upper member 30 at a part that is substantially in the vehicle longitudinal direction, but also can deform in the direction of crushing under the action of a load acting from the upward vehicle direction. According to this configuration, when the colliding body 70 shown in FIG. 4 collides with the boundary part between the upper end part 22A of the front fender panel 20 and the hood outer panel 16 from the vehicle upward direction, as shown in FIG. 5, the force of impact F when that occurs causes the shock-absorbing bracket 34 to deform so as to be crushed, thereby absorbing the energy at the time of the collision.

Also, as shown in FIG. 2, the terminal part 24C on the inside of the front fender panel 20 and the shock-absorbing bracket 34 are covered and hidden from the inside in the transverse direction by the fender protector 50 that extends continuously in the substantially longitudinal direction of the vehicle. For example, when the hood 14 (refer to FIG. 1) is opened, the terminal part 24C on the inside of the front fender panel 20 and the shock-absorbing bracket 34 cannot be visually verified from the front side of the vehicle. For this reason, appearance is good.

Also, as shown in FIG. 3, in the insertion part 64 of the vehicle body side structure 60 in which is formed an insertion opening 64A along the substantially longitudinal direction of the vehicle in the vicinity of the distal end 56 of the fender protector 50, the fender protector 50 is inserted from the insertion opening 64A when a collision of a colliding body 70 occurs, in which a load acts from the vehicle upward direction on the upper end part of the front fender panel 20. For this reason, when a collision occurs with the colliding body 70, as shown in FIG. 5, even if the front fender panel 20 and the shock-absorbing bracket 34 deform, by the fender protector 50 being inserted into the insertion part 64, there is almost no repulsing force from the fender protector 50 toward the front fender panel 20.

In this case, because the guide part 56A guides the fender protector 50 toward the insertion part 64 at the time of a collision with the colliding body 70, as shown in FIG. 3, even in the case, for example, in which the relative position of the distal end 56 of the fender protector 50 with respect to the insertion part 64 is offset in the assembled condition, variation in the relative position of the fender protector 50 with respect to the insertion part 64 is tolerated, and the fender protector 50 is smoothly inserted so as to slide toward the insertion part 64.

As a further explanation, because the fender protector 50 is a resin part, some small variation in dimensions (for example, 1 mm to 2 mm) may occur, and a positional adjustment of the front fender panel 20 and the hood 14 (adjustment when placing the front fender panel 20 in place) may cause a variation in the relative position between the front fender panel 20 and the vehicle body side structure 60 (including the apron upper member 30). According to this embodiment, however, even if these cause a slight shift in the relative position of the fender protector 50 with respect to the insertion part 64 from the proper position indicated in the drawings, the guide part 56A can cause the fender protector 50 to slide into the insertion part 64.

Because the weak part 55 that serves as the origin point for bending deformation toward substantially in the transverse direction is provided at the intermediate part 54 of the fender protector 50, when a collision occurs with the colliding body 70, even if the distal end 56 of the fender protector 50 comes into contact with the vehicle body side structure 60 at the stage at which the distal end 56 is inserted into the insertion part 64, the fender protector 50 is successively inserted into the insertion part 64 as it bends slightly with the weak part 55 as the origin, thereby effectively suppressing repulsive force toward the front fender panel 20.

Because the dimension L1 from the lowermost end position 64B to the insertion opening 64A of the insertion part 64 and the dimension L2 from the distal end 56 to the weak part 55 of the fender protector 50 are set so that the relationship L2≧L1 is satisfied, when a collision occurs with the colliding body 70, the distal end 56 of the fender protector 50 is inserted until it reaches the lowermost end position 64B of the insertion part 64, after which, with the fender protector 50 hitting bottom at the lowermost end position 64B of the insertion part 64, there is bending deformation with a low load toward substantially the transverse direction with the weak part 55 as the origin. That is, because the bending deformation of the fender protector 50 at low load occurs after the insertable dimension of the insertion part 64 is fully used, it is possible to effectively maintain the deformation stroke amount of the front fender panel 20.

Figure 6:
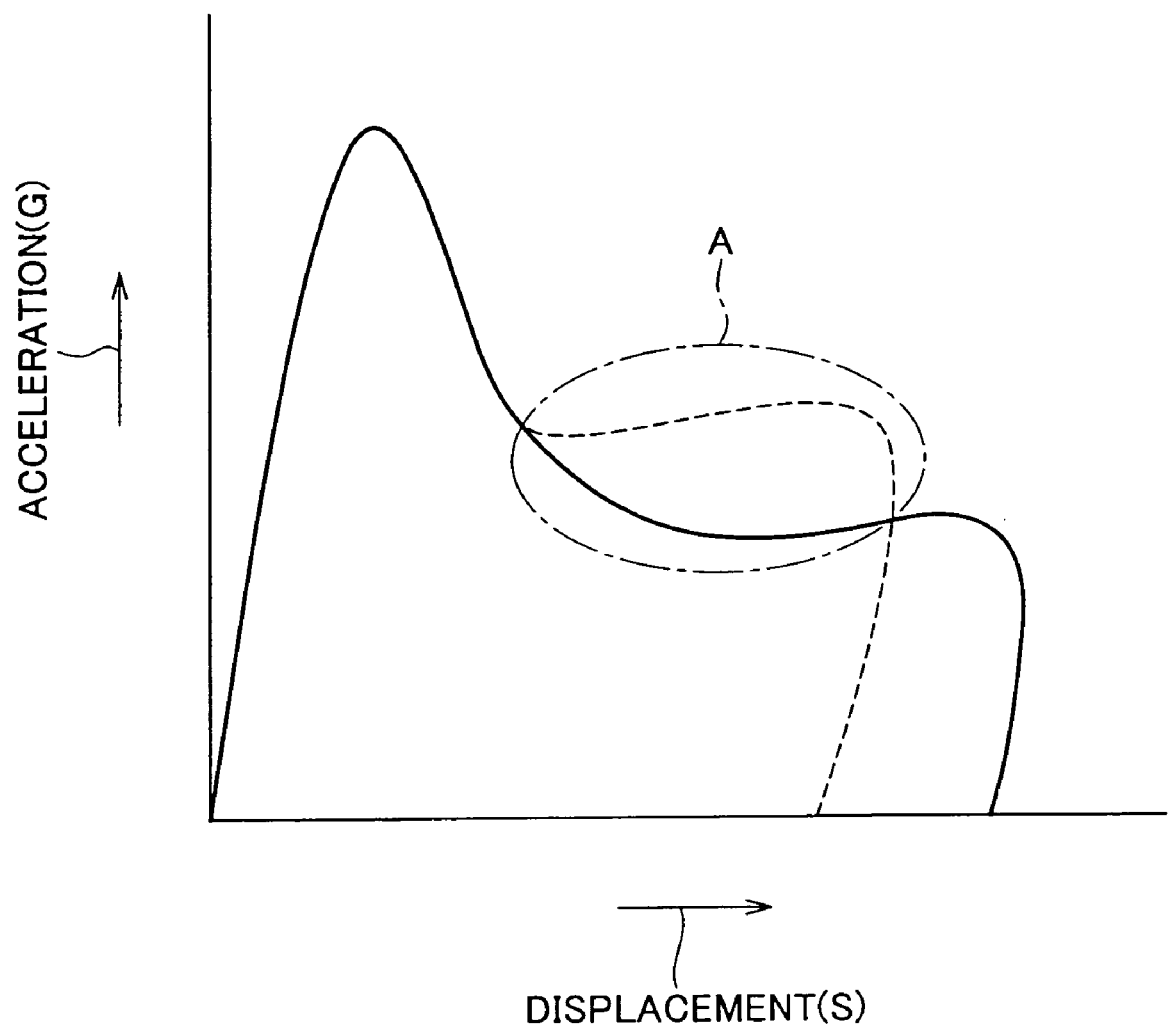
FIG. 6 is a graph showing the relationship between the acceleration and the displacement when an impactor collides with the boundary part.

As shown schematically by FIG. 6, which shows the relationship the displacement (S) of the fender protector and the deformation acceleration (G) (hereinafter "G-S curve"), compared to the comparison structure in which the distal end of the fender protector is fixed to the apron upper member (shown by the dotted line G-S), because there is almost no repulsing force by the deformation of the fender protector 50, the acceleration (load) in the latter half of the waveform is reduced and it is possible to obtain good acceleration (region surrounded by the single dot-dash line in FIG. 6), and, because there is little residual uncrushed amount, it is also possible to achieve stroke more reliably.

As described above, according to the vehicle front part structure of this embodiment, it is possible to achieve a good load stroke at the time of a collision with the colliding body as shown in FIG. 4 and FIG. 5, while achieving a good appearance on the inside of the front fender panel 20 shown in FIG. 2, The second embodiment of the present invention will next be described with reference to FIG. 7. A feature of the second embodiment, as shown in FIG. 7, is that vehicle body side structure (engine cover 80) is formed as a single member, with other aspects of the configuration being substantially the same as the first embodiment. Constituent elements that are substantially the same as in the first embodiment are assigned the same reference numerals and the description thereof are omitted herein.

As shown in FIG. 7, the engine cover (built-in part) 80 as the vehicle body side structure is provided so as to extend as far as a part of the apron upper member 30 toward the inside in the transverse direction, and has an insertion opening 82A that is formed along the substantially longitudinal direction of the vehicle approaching the distal end 56 of the fender protector 50, and an insertion part 82 in the form of an elongated channel into which the fender protector 50 can slide into from the insertion opening 82A (from the insertion part 56 side). That is, the engine cover 80 can accept the fender protector 50 inside the channel-shaped insertion part 82. With this type of configuration as well, the same type of operation and effect are achieved as with the first embodiment.

Although in the above-noted embodiments the structure is such that the fender protector 50 is slid into the insertion parts 64, 82 when a load acts on the upper end part 22A of the front fender panel 20 from above the colliding body relative to the vehicle, alternatively, for example, a structure may be adopted in which, when the load acts, the distal end side of the covering member is inserted into the insertion part without coming into contact with the vicinity of the insertion opening or the inner wall of the insertion part.

Also, although in the above-noted embodiments the shock-absorbing bracket 34 as the shock-absorbing part links the horizontal flange part 24B of the front fender panel 20 with the apron upper member 30, alternatively a structure may be adopted in which a shock-absorbing part capable of deformation in the crushing direction with respect to a load acting from above relative to the vehicle, is fixed, for example, the terminal part side on the inside of the fender panel, is fixed to the apron upper member, the end part of the inside of the fender panel may be a vertical wall part forming a art of the end part of the inside of the fender panel.

Also, while a configuration is preferable in which the distal end 56 of the fender protector 50 is provided with a guide part 56A as a guide means, a configuration in which there is no guide means may be adopted, and a configuration may be adopted in which a different guide means such as one that guides a covering member toward the insertion part when a load acts from above relative to the vehicle on the upper end part of the fender panel is provided on a part of the vehicle body side structure.

Additionally, although in the above-noted embodiments a configuration is preferable in which a weak part 55 is provided in the intermediate part 54 of the fender protector 50, such as shown in FIG. 3, a configuration may be adopted in which a weak part is not provided in the intermediate part of the covering member. Although the weak part 55 in the above-noted embodiments has a notch 54D formed in the bending part 54C, as long as the weak part is a part that forms the origin of bending deformation in bending in substantially the transverse direction, the weak point may be another weak point, such as simply a bending part, a part having thin material, or a formed part having a small hole.

Additionally, while in the above-noted embodiments the dimension L1 from the lowermost end position 64B to the insertion opening 64A of the insertion part 64 and the dimension L2 from the distal end 56 to the weak part 55 of the fender protector 50 are set so that the relationship $L2 \geq L1$ is satisfied and this type of configuration is preferred, an alternate configuration may be adopted in which the dimension L2 is slightly shorter than L1, for example, so that the relationship $L2 \geq L1$ is not satisfied.

Although in the above-noted embodiments are described for the example in which the intermediate upper part 54A of the fender protector 50 is inclined downward toward the inside of the transverse direction, the intermediate upper part of the covering member may extend in the downward vehicle direction at an inclination toward the outside in the transverse direction. Also, although in the above-noted embodiments the intermediate lower part 54B of the fender protector 50 extends substantially in the downward vehicle direction, the lower part of the intermediate part of the covering member may alternatively extend in the downward vehicle direction at an inclination toward either the outside or the inside in the transverse direction.

In the above-noted embodiments, although the inner wall part 24 (inside end part) of the front fender panel 20 is bent in substantially the downward vehicle direction at the boundary part with the hood outer panel 16 (hood panel), the inside end part of the fender panel may, for example, be bent substantially in the downward vehicle direction so that it is provided substantially horizontally, bent toward the inside in the transverse direction at the boundary part with the hood panel.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, fewer, or only a single element, are also within the spirit and scope of the invention.

What is claimed is:

1. A vehicle front structure comprising:
   a fender panel having an outer wall that forms a side of the vehicle front, an inside end part being bent at a boundary part with a hood panel;
   an apron upper member that extends in substantially the vehicle longitudinal direction, parallel to the outer wall of the fender panel;
   a shock-absorbing part that links an inside end of the fender panel and the apron upper member;
   a cover member, the base end of which is mounted on the inside of the fender panel and that hangs downward as a free end in the substantially downward direction of the vehicle, covers a distal end on the inside of the fender panel and the shock-absorbing part, and extends in substantially the vehicle longitudinal direction; and a vehicle side-structure that includes an insertion part formed in substantially the vehicle longitudinal direction near the distal end of the cover member, and into which the cover member may be inserted from above.

2. The vehicle body vehicle front structure according to claim 1, wherein the shock-absorbing part forms a part of the inside end part of the fender panel.

3. The vehicle front structure according to claim 1, wherein the cover member includes a guide portion that guides the cover member toward the insertion part of the vehicle side-structure.

4. The vehicle front structure according to claim 3, wherein the guide portion is formed with an end that is directed toward the insertion part of the vehicle body side-structure.

5. The vehicle front structure according to claim 1, wherein the cover member has a weak part that serves as an origin point for bending deformation substantially in the transverse direction, formed in an intermediate part between the base end part and the distal end.

6. The vehicle front structure according to claim 5, wherein the cover member has a cutaway part in the weak part.

7. The vehicle front structure according to claim 5, wherein the cover member is formed by bending at the weak part.

8. The vehicle front structure according to claim 5, wherein the cover member is formed with thin material at the weak part.

9. The vehicle front structure according to claim 5, wherein the cover member has one or a plurality of weak parts.

10. The vehicle front structure according to claim 5, wherein a dimension L1 from a lowermost end position to the insertion opening of the insertion part and a dimension L2 from the distal end to the weak part of the covering member are set so that the relationship $L2 \geq L1$ is satisfied.

11. The vehicle front structure according to claim 1, wherein the vehicle body side-structure is formed by a plurality of members and the insertion part is formed as a gap between the plurality of members.

12. The vehicle front structure according to claim 1, wherein the vehicle body side-structure is formed by one member, and the insertion part is formed as a channel in the one member.

* * * * *